Patented Oct. 18, 1932

1,882,824

UNITED STATES PATENT OFFICE

WILLIAM J. HALE AND JOSEPH W. BRITTON, OF MIDLAND, MICHIGAN, ASSIGNORS TO THE DOW CHEMICAL COMPANY, OF MIDLAND, MICHIGAN, A CORPORATION OF MICHIGAN

PROCESS FOR THE MANUFACTURE OF PHENOLS

No Drawing. Application filed October 30, 1926. Serial No. 145,364.

It has long been known that halogenated benzene hydrocarbons can be hydrolyzed by caustic soda in an aqueous solution at an elevated temperature, and since the report of Dusart and Bardy (Compt. Rend. 74, 1051), various investigators have suggested refinements of operation in the attempt to arrive at a practicable process. Meyer and Bergius in the United States Patent 1,062,-351, for instance proposed to heat under pressure chlorobenzene with water and sufficient caustic soda to neutralize the hydrochloric acid formed. Aylsworth in the United States Patent 1,213,142 proposed the use of enough caustic soda to form phenate and also provide an excess tending to prevent formation of phenylethers. It has also been proposed to modify the reaction by adding methyl alcohol (German Patent 281,175). In such procedure, the product of the reaction is a phenate, and a step of acidification is then required in order to produce phenol. A process which will produce phenol direct and at the same time with yields of worth-while proportion is accordingly highly desirable.

To the accomplishment of the foregoing and related ends, the invention, then, consists of the steps hereinafter fully described, and particularly pointed out in the claims, the following description setting forth but one of the various ways in which the principle of the invention may be used.

In accordance with the present invention, a halogenated benzene is heated under pressure with water and a salt of a strong base and weak acid while exposed to an agent facilitating the reaction. Such salt should be also characterized by yielding upon reaction with the benzene halide a product substantially unreactive with free phenol. For the facilitating or catalytic agent, copper in available form has proved particularly effective, and it may be employed as strips, cuttings, etc., or as lining surfaces in the reaction vessel.

As an illustrative example, the preparation of phenol for instance may be noted as follows: Chlorobenzene and sodium carbonate in about equal molecular proportion are subjected to a temperature of 250° to 375° C., preferably about 325° C. and under a pressure to 4000 pounds per square inch, varying according to the temperature employed, in the presence of water and in exposure to copper, for instance strips or any extended surface-presenting form. As a further means of securing extensive surface contact with the copper, the reaction materials may be actively circulated, for example by recycling if a tubular system be employed, or stirring or the like where the copper is in the form of baffles, etc. After one-fourth to one-half hour, the products are drawn off by a large discharge pipe, which itself may be of iron, and the phenol is separated by steam distillation.

Of the various similar salts of strong bases and weak acids which can be used, the phosphates and borates of alkali metals may be particularly instanced.

The following equations are illustrative of the process described, viz.,

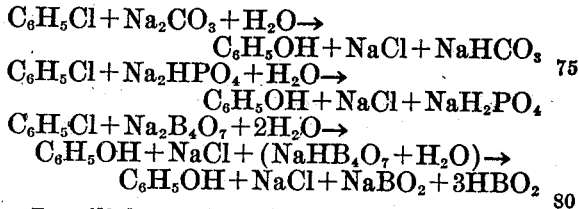

It will be noticed that in the first equation the reaction of the sodium carbonate with the chlorobenzene yields sodium acid carbonate which is substantially neutral in its action toward phenol under the conditions obtaining; and analogously in the case of the other equations.

By proceeding in similar manner, phenols generally can be readily prepared and in good practicable yields.

Other modes of applying the principle of the invention may be employed, change being made as regards the details described, provided the step or steps stated in any of the following claims or the equivalent of such be employed.

We therefore particularly point out and distinctly claim as our invention:—

1. The method of making a free phenol directly without acidification of the reaction product which comprises reacting a halogenated benzene hydrocarbon and an aqueous solution of a salt of a strong base and weak acid by heating under pressure at a temperature between 250° and 375° C. in the presence of metallic copper as catalyst.

2. The method of making a free phenol directly without acidification of the reaction product which comprises reacting a halogenated benzene hydrocarbon and an aqueous solution of a salt from the group consisting of the alkali-metal carbonates, borates and phosphates by heating under pressure at a temperature between 250° and 375° C. in the presence of metallic copper as catalyst.

3. The method of making free phenol directly without acidification of the reaction product which comprises heating a mono-halogenated benzene and an aqueous solution of a salt from the group consisting of the alkali-metal carbonates, borates and phosphates at a temperature between 250° and 375° C. in the presence of metallic copper as catalyst.

4. The method of making free phenol directly without acidification of the reaction product which comprises heating chlorobenzene and an aqueous sodium carbonate solution under pressure at a temperature between 250° and 375° C. in the presence of metallic copper as catalyst.

5. The method of making phenol which comprises reacting chlorobenzene with an aqueous sodium carbonate solution by heating under pressure at a temperature between 250° and 375° C. in the presence of metallic copper, whereby free phenol instead of a water-soluble phenate is formed, and separating said phenol directly from the reaction product without acidification thereof.

6. The method of making a phenol which comprises reacting a halogenated benzene hydrocarbon with an aqueous solution of a basic salt from the group consisting of the alkali-metal carbonates, borates and phosphates by heating under pressure at a temperature between 250° and 375° C. in the presence of metallic copper, whereby the free phenol instead of a water-soluble phenate is formed, and separating such phenol directly from the reaction product without acidification thereof.

7. The method of making phenol which comprises reacting chlorobenzene with an aqueous solution of a basic salt from the group consisting of the alkali-metal carbonates, borates and phosphates by heating under pressure at a temperature between 250° and 375° C. in the presence of metallic copper, whereby free phenol instead of the water-soluble alkali-metal phenate is formed, and separating said phenol directly from the reaction product without acidification thereof.

Signed by us this 22nd day of October, 1926.
WILLIAM J. HALE.
JOSEPH W. BRITTON.